United States Patent
Kimura

(10) Patent No.: US 12,483,793 B2
(45) Date of Patent: Nov. 25, 2025

(54) IMAGE CAPTURING APPARATUS, CONTROL METHOD, AND RECORDING MEDIUM WITH AUTOMATED DEFOCUSING BASED ON TILT CONTROL

(71) Applicant: CANON KABUSHIKI KAISHA, Tokyo (JP)

(72) Inventor: Hiroaki Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 158 days.

(21) Appl. No.: 18/351,989

(22) Filed: Jul. 13, 2023

(65) Prior Publication Data

US 2024/0022822 A1   Jan. 18, 2024

(30) Foreign Application Priority Data

Jul. 15, 2022   (JP) ................. 2022-114322

(51) Int. Cl.
*H04N 23/695*   (2023.01)
*G06V 10/74*   (2022.01)

(52) U.S. Cl.
CPC ......... *H04N 23/695* (2023.01); *G06V 10/761* (2022.01)

(58) Field of Classification Search
CPC .... H04N 23/695; H04N 23/58; H04N 23/672; H04N 23/67; H04N 23/671; H04N 23/80; H04N 23/54; G06V 10/761
See application file for complete search history.

(56) References Cited

U.S. PATENT DOCUMENTS

| | | | |
|---|---|---|---|
| 2017/0272658 A1 | 9/2017 | Ito | |
| 2020/0275032 A1* | 8/2020 | Kimura | ............... H04N 23/673 |
| 2021/0144307 A1* | 5/2021 | Kimura | ................. H04N 23/69 |

FOREIGN PATENT DOCUMENTS

| | | |
|---|---|---|
| JP | 2001-116980 A | 4/2001 |
| JP | 2003-075716 A | 3/2003 |

OTHER PUBLICATIONS

The above patent documents was cited in a European Search Report issued on Nov. 8, 2023, that issued in the corresponding European Patent Application No. 23184711.2.

* cited by examiner

*Primary Examiner* — Christopher K Peterson
(74) *Attorney, Agent, or Firm* — Cowan, Liebowitz & Latman, P.C.

(57) ABSTRACT

An image capturing apparatus comprises: an image sensor for generating an image signal from an object image formed by an imaging optical system; a tilt control unit configured to execute tilt control of tilting the image sensor with respect to a principal surface of the imaging optical system; a deriving unit configured to derive, by a phase difference detection pixel included in the image sensor, a defocus amount with respect to an object image at a position of the phase difference detection pixel; and a control unit configured to control to execute the tilt control by the tilt control unit in deriving the defocus amount by the deriving unit, and to derive, by the deriving unit, a defocus amount based on an object image obtained while executing the tilt control.

11 Claims, 11 Drawing Sheets

FIG. 8

| | | FOCAL LENGTH | | |
|---|---|---|---|---|
| | | 10mm | 50mm | 200mm |
| F VALUE | F2.8 | TILT | TILT | TILT |
| | F5.6 | NO TILT | TILT | TILT |
| | F11 | NO TILT | NO TILT | NO TILT |

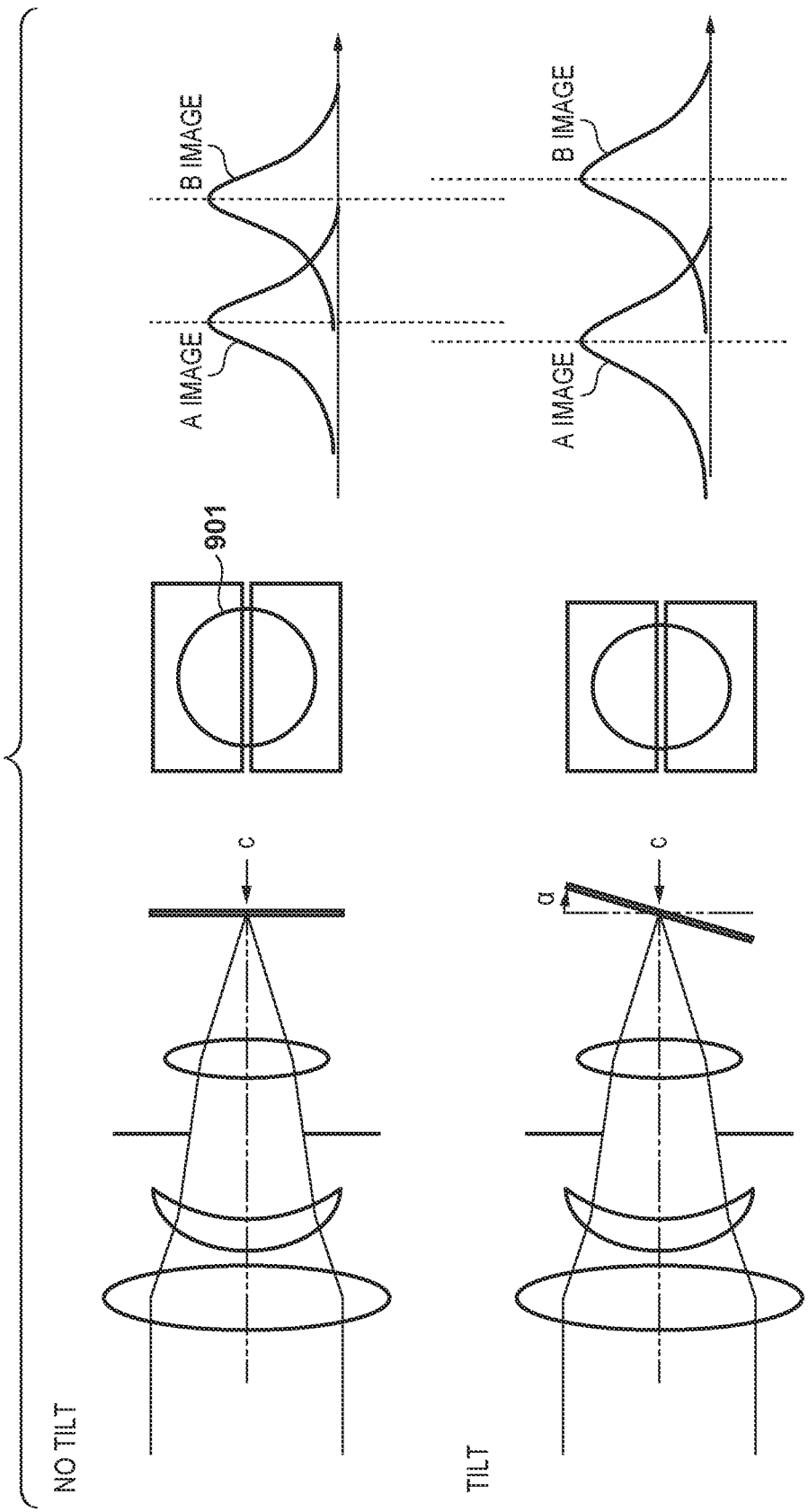

FIG. 10A

|  |  | IMAGE HEIGHT | | |
|---|---|---|---|---|
|  |  | l0 | c0 | h0 |
| FOCUS POSITION | Far | a | b | c |
|  | Near | d | e | f |

FIG. 10B

|  |  | TILT ANGLE | | |
|---|---|---|---|---|
|  |  | 0° | 5° | 10° |
| COMBINE AS DEFINED BY (a) | a | 0.98 | 0.97 | 0.96 |
|  | b | 1.00 | 0.99 | 0.98 |
|  | c | 0.98 | 0.98 | 0.97 |
|  | d | 0.98 | 0.97 | 0.95 |
|  | e | 1.01 | 1.00 | 0.98 |
|  | f | 0.98 | 0.97 | 0.96 |

IMAGE CAPTURING APPARATUS, CONTROL METHOD, AND RECORDING MEDIUM WITH AUTOMATED DEFOCUSING BASED ON TILT CONTROL

BACKGROUND OF THE INVENTION

Field of the Invention

The present invention relates to focus control and tilt control in an image capturing apparatus.

Description of the Related Art

In some cases, a surveillance camera is installed in a high place, and is made to face obliquely downward to monitor people passing on a road or capture a car or its license plate. Since an object (person, car, or license plate) is located along the surface of the road, the focus plane of the camera does not match the surface on which the object is located in the above-described situation. As a result, in a range captured by the camera, only a partial region is in focus and the remaining region blurs. As a technique of widening an in-focus region (the range of the depth of field) in such situation, there is known a technique (called "tilt") of capturing an image by relatively tilting a lens and an image sensor.

Japanese Patent Laid-Open No. 2003-75716 (patent literature 1) discloses a technique of deciding a focus position and a tilt control amount based on a contrast evaluation value to focus on a plurality of objects. Japanese Patent Laid-Open No. 2001-116980 (patent literature 2) describes a method of driving a focus position from one end to the other end, and storing the focus position at which a contrast evaluation value for each of a plurality of objects is maximum.

However, an image capturing apparatus disclosed in each of patent literatures 1 and 2 derives a contrast evaluation value by actually moving a lens and an image sensor and obtains a tilt angle and a focus position. Therefore, it takes time to calculate the tilt angle and the focus position. In addition, an unnecessary operation (for example, a reciprocating operation around an in-focus position) is performed for the lens and the image sensor, thereby degrading the quality of an obtained video. Furthermore, since the size of a display device and the resolution (4K or 8K) of a video have recently be increased, it is necessary to obtain a higher quality video.

SUMMARY OF THE INVENTION

According to one aspect of the present invention, an image capturing apparatus comprises: an image sensor for generating an image signal from an object image formed by an imaging optical system; a hardware processor; and a memory for storing instructions to be executed by the hardware processor, wherein, when the instructions stored in the memory are executed by the hardware processor, the image capturing apparatus functions as: a tilt control unit configured to execute tilt control of tilting the image sensor with respect to a principal surface of the imaging optical system; a deriving unit configured to derive, by a phase difference detection pixel included in the image sensor, a defocus amount with respect to an object image at a position of the phase difference detection pixel; and a control unit configured to control to execute the tilt control by the tilt control unit in deriving the defocus amount by the deriving unit, and to derive, by the deriving unit, a defocus amount based on an object image obtained while executing the tilt control.

The present invention makes it possible to obtain a high quality video.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a table showing an example of a determination table used to determine whether to perform initial tilting or not;

FIG. 9 is a view for explaining a pixel shift amount in a case where the image sensor is tilted;

FIGS. 10A and 10B are tables showing examples of correction tables of a conversion coefficient.

DESCRIPTION OF THE EMBODIMENTS

Figure 1:
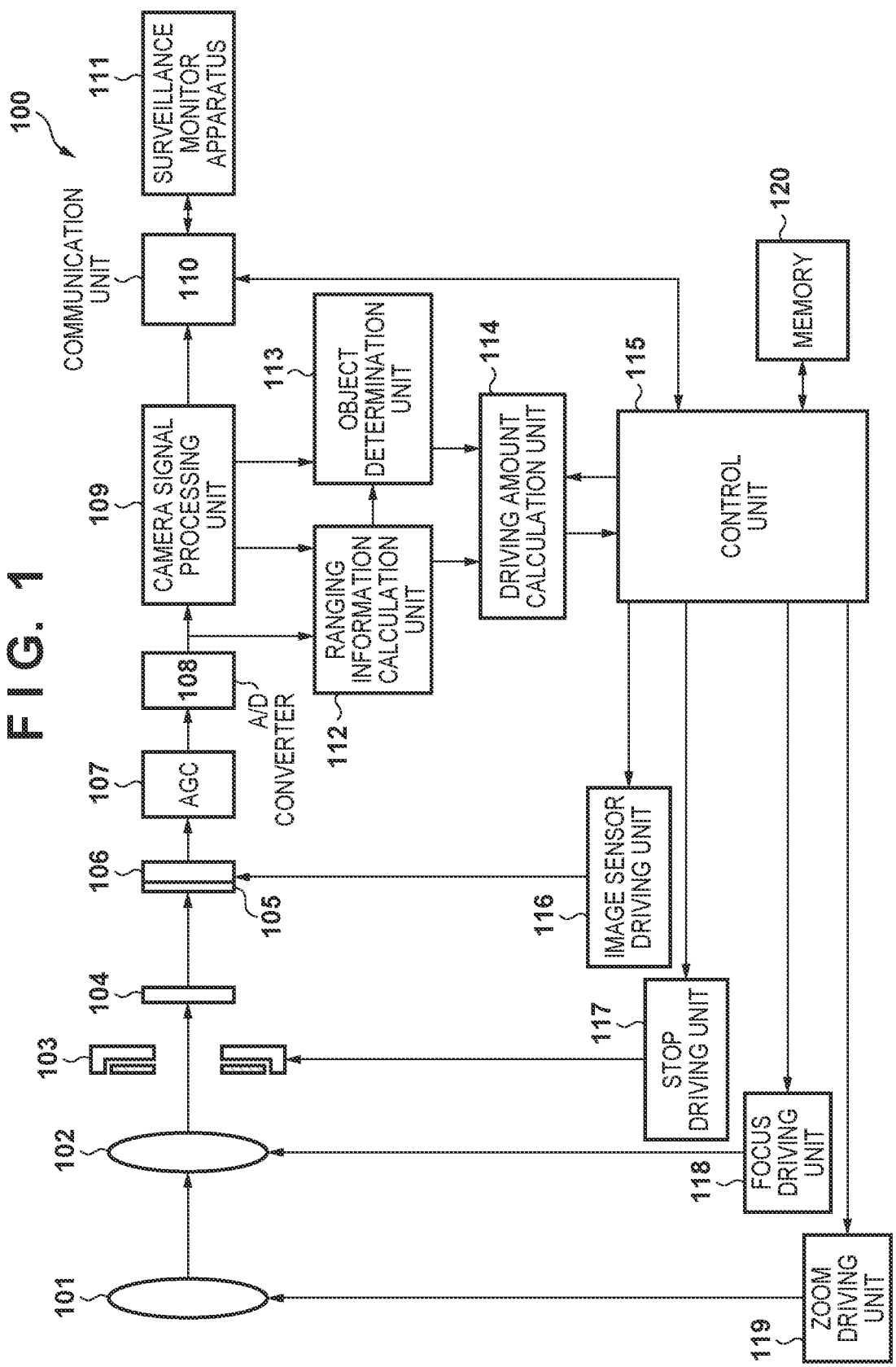
FIG. 1 is a block diagram showing the arrangement of an image capturing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As the first embodiment of an image capturing apparatus according to the present invention, an image capturing apparatus 100 using Auto Focus (on-imaging plane phase difference AF) by an on-imaging plane phase difference method will be exemplified below.

<Overview>

It is possible to accurately obtain a tilt angle and a focus position by using the on-imaging plane phase difference AF and tilt control in combination. Especially, by using the on-imaging plane phase difference AF, it is possible to calculate a defocus amount and the moving direction of the focus position without moving a lens. Furthermore, in a state in which tilt control is executed, ranging is performed to increase a base-line length in a pseudo manner, thereby making it possible to improve ranging accuracy with respect to a far object.

<Apparatus Arrangement>

FIG. 1 is a block diagram showing the arrangement of the image capturing apparatus 100. The image capturing apparatus 100 includes an imaging optical system including a zoom lens 101, a focus lens 102, and a stop unit 103.

The zoom lens 101 is a lens configured to be movable in an optical axis direction and to change the focal length of the imaging optical system. The focus lens 102 is a lens configured to be movable in an optical axis direction and to perform focus control. The stop unit 103 adjusts a light amount by controlling a stop.

Light having passed through the imaging optical system is received by an image sensor 106 via a bandpass filter (BPF) 104 and a color filter 105. The bandpass filter 104 is, for example, an infrared (IR) cut-off filter, and may be configured to be inserted/removed to/from the optical path of the imaging optical system. The color filter 105 is, for example, an RGB filter of a Bayer arrangement.

The image sensor 106 includes a CMOS sensor, and photoelectrically converts an optical image (object image) formed via the imaging optical system. An automatic gain control unit (AGC) 107 performs gain adjustment for an analog signal (image signal) output from the image sensor 106. An Analog-to-Digital (A/D) converter 108 converts the analog signal into a digital signal (digital image signal).

A camera signal processing unit 109 performs various kinds of image processes for the digital image signal, thereby generating a video signal. A communication unit 110 is configured to be communicable with an external apparatus such as a surveillance monitor apparatus 111. For example, the communication unit 110 outputs the video signal to the surveillance monitor apparatus 111 connected to the image capturing apparatus 100 by wired or wireless communication. Furthermore, the communication unit 110 receives a command from the external apparatus, and outputs a control signal corresponding to the command to a control unit 115.

A ranging information calculation unit 112 receives RGB pixel values or luminance values from the camera signal processing unit 109 for each target object region, and calculates distance information based on a phase difference. More specifically, the camera signal processing unit 109 generates, as focus detection data, a pair of image data formed by light beams passing through a pair of pupil regions of the imaging optical system. Then, the ranging information calculation unit 112 calculates a defocus amount based on a shift amount between the pair of image data.

As described above, the ranging information calculation unit 112 performs ranging by the on-imaging plane phase difference method based on the output from the image sensor 106 without using a dedicated AF sensor. Note that details of the ranging information calculation operation of the ranging information calculation unit 112 by the on-imaging plane phase difference method will be described later. Note also that the ranging information calculation unit 112 may obtain an evaluation value (contrast evaluation value) concerning the contrast of a specific frequency, and calculate a defocus amount based on the difference between the original focus position and a focus position at which the contrast evaluation value exhibits a peak.

An object determination unit 113 receives a result from the camera signal processing unit 109, and detects an object in an imaging screen. Furthermore, the object determination unit 113 can determine an object (for example, a person or a car) designated or preset by the user.

A driving amount calculation unit 114 obtains ranging information from the ranging information calculation unit 112 and object information from the object determination unit 113. Furthermore, the driving amount calculation unit 114 performs control amount calculation of an appropriate tilt control amount (angle) and focus control amount (position) based on the information of the tilt angle and focus position from the control unit 115 in addition to the obtained ranging information and object information.

The control unit 115 instructs an image sensor driving unit 116 and a focus driving unit 118 based on the tilt angle and focus position calculated by the driving amount calculation unit 114. In accordance with an instruction from the communication unit 110, the control unit 115 executes focus control by auto focus (AF) or manual focus (MF), zoom control, and stop control. Furthermore, the control unit 115 receives the current positions (setting values) from the image sensor driving unit 116, a stop driving unit 117, the focus driving unit 118, and a zoom driving unit 119, and outputs the current positions to the driving amount calculation unit 114.

A memory 120 stores data concerning a program to be executed by the control unit 115. Furthermore, the memory 120 stores data concerning a shading correction coefficient (to be described later) and data concerning a conversion coefficient.

The image sensor driving unit 116 controls the tilt (tilt angle) of the image sensor 106 with respect to the optical axis of the imaging optical system based on the tilt angle instructed from the control unit 115. In this example, assume that the image sensor 106 tilts by rotating about a rotation axis (tilt axis) passing through the center of the image sensor 106 and parallel to the image sensor 106. However, the present invention is not limited to this.

The stop driving unit 117 controls the stop unit 103 based on the f-number setting value instructed from the control unit 115. The focus driving unit 118 controls the position of the focus lens 102 based on the focus position setting value (defocus amount) instructed from the control unit 115. The zoom driving unit 119 controls the position of the zoom lens 101 based on the zoom setting value instructed from the control unit 115.

<Calculation of Ranging Information>

Figure 2:
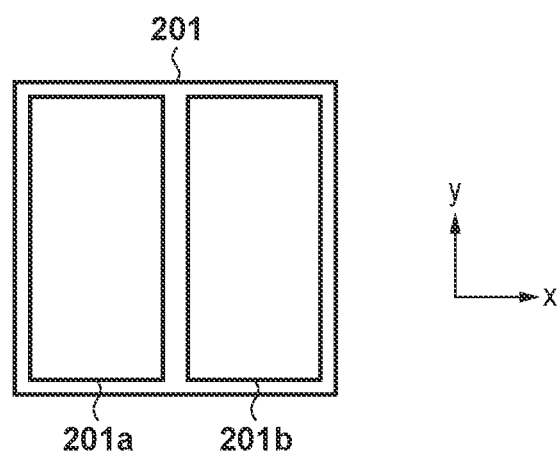
FIG. 2 is a view showing the arrangement of a pixel forming an image sensor.

FIG. 2 is a view showing the arrangement of a pixel 201 forming the image sensor 106. FIG. 2 shows, as the pixel 201, an example of a phase difference detection pixel used by the on-imaging plane phase difference method. The phase difference detection pixel is a pixel divided into two parts (photoelectric converters 201a and 201b) with respect to the X direction, as shown in FIG. 2. Assume here that all pixels forming the imaging surface of the image sensor 106 are all phase difference detection pixels, but only some of the pixels may be configured as phase difference detection pixels.

The image sensor 106 is configured to individually output the photoelectric conversion signal of one of the photoelectric converters 201a and 201b and the sum of the photoelectric conversion signals of the photoelectric converters 201a and 201b. Note that the photoelectric conversion signal of one (for example, the photoelectric converter 201a) of the two photoelectric converters is subtracted from the sum of the two photoelectric conversion signals, thereby making it possible to obtain a signal corresponding to the photoelectric conversion signal of the other (for example, the photoelectric converter 201b) of the two photoelectric converters. The following description assumes that the ranging information calculation unit 112 reads out, from each pixel, the photoelectric conversion signal of the photoelectric converter 201*a* and the sum of the photoelectric conversion signals of the two photoelectric converters.

The photoelectric conversion signal of each photoelectric converter is used as focus detection data for phase difference AF. The sum of the two photoelectric conversion signals is used as normal captured image data. Note that such image sensor is known and a detailed description thereof will be omitted.

The ranging information calculation unit 112 calculates, as ranging information (pixel shift amount), by correlation calculation, a relative image shift amount between the photoelectric conversion signal (to be referred to as an "A image" hereinafter) of the photoelectric converter 201*a* and the photoelectric conversion signal (to be referred to as a "B image" hereinafter) of the photoelectric converter 201*b*. This can calculate a pixel shift amount [pixels (width)] as the correlation between the pair of image signals (A image and B image). Then, the pixel shift amount is multiplied by a conversion coefficient to be converted into a defocus amount [mm] of a predetermined region.

Next, the ranging information calculation operation by the on-imaging plane phase difference method will be described in more detail. The following ranging information calculation operation is executed mainly by the ranging information calculation unit 112.

First, the ranging information calculation unit 112 sets a focus detection position. Subsequently, the ranging information calculation unit 112 reads out focus detection data. That is, the signal of each of the A image and the B image is generated based on a signal read out from the pixel in the set focus detection position. Subsequently, the ranging information calculation unit 112 obtains a pixel shift amount P by obtaining the relative image shift amount between the A image and the B image by correlation calculation.

Figure 3:
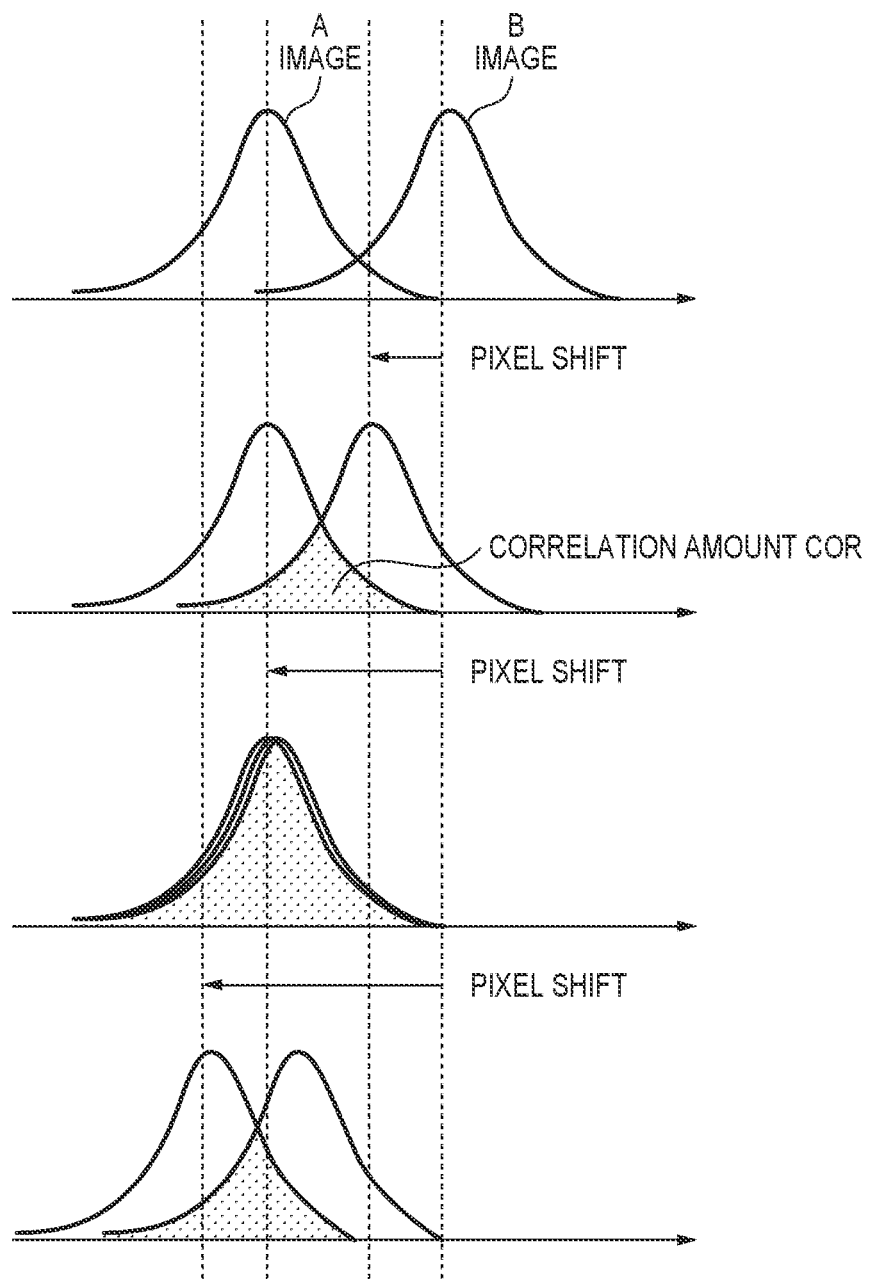
FIG. 3 shows graphs for explaining a method of calculating a pixel shift amount.

FIG. 3 shows graphs for explaining a correlation calculation (pixel shift amount calculation) method. In FIG. 3, the ordinate represents a signal value and the abscissa represents a pixel (position). Assume here that the signals of the A image and the B image are obtained from the pixel (phase difference detection pixel) at the focus detection position in the image sensor 106.

The camera signal processing unit 109 first performs digital filter processing for each of the A image and the B image to reduce noise. FIG. 3 shows some examples of a waveform after the filter processing.

As shown in FIG. 3, the ranging information calculation unit 112 calculates a correlation amount COR at each shift position while shifting one of the A image signal and the B image signal or while pixel-shifting both the A image signal and the B image signal. At this time, the correlation amount COR is an area obtained by superimposing the A image and the B image, a value obtained by subtracting the area of the B image from the area of the A image, a calculation value representing the correlation, or the like, but is not limited to them. A case where the correlation amount COR is the area obtained by superimposing the A image and the B image will be described below.

If the A image and the B image match each other, the overlapping portion between the A image and the B image is large, and thus the correlation is highest (the correlation amount COR is largest) (the third state from the top of FIG. 3). A shift amount when the correlation amount COR is the maximum value is the pixel shift amount P. Subsequently, a conversion coefficient K as a value by which the pixel shift amount P is multiplied to obtain a defocus amount DEF is obtained.

Figure 4:
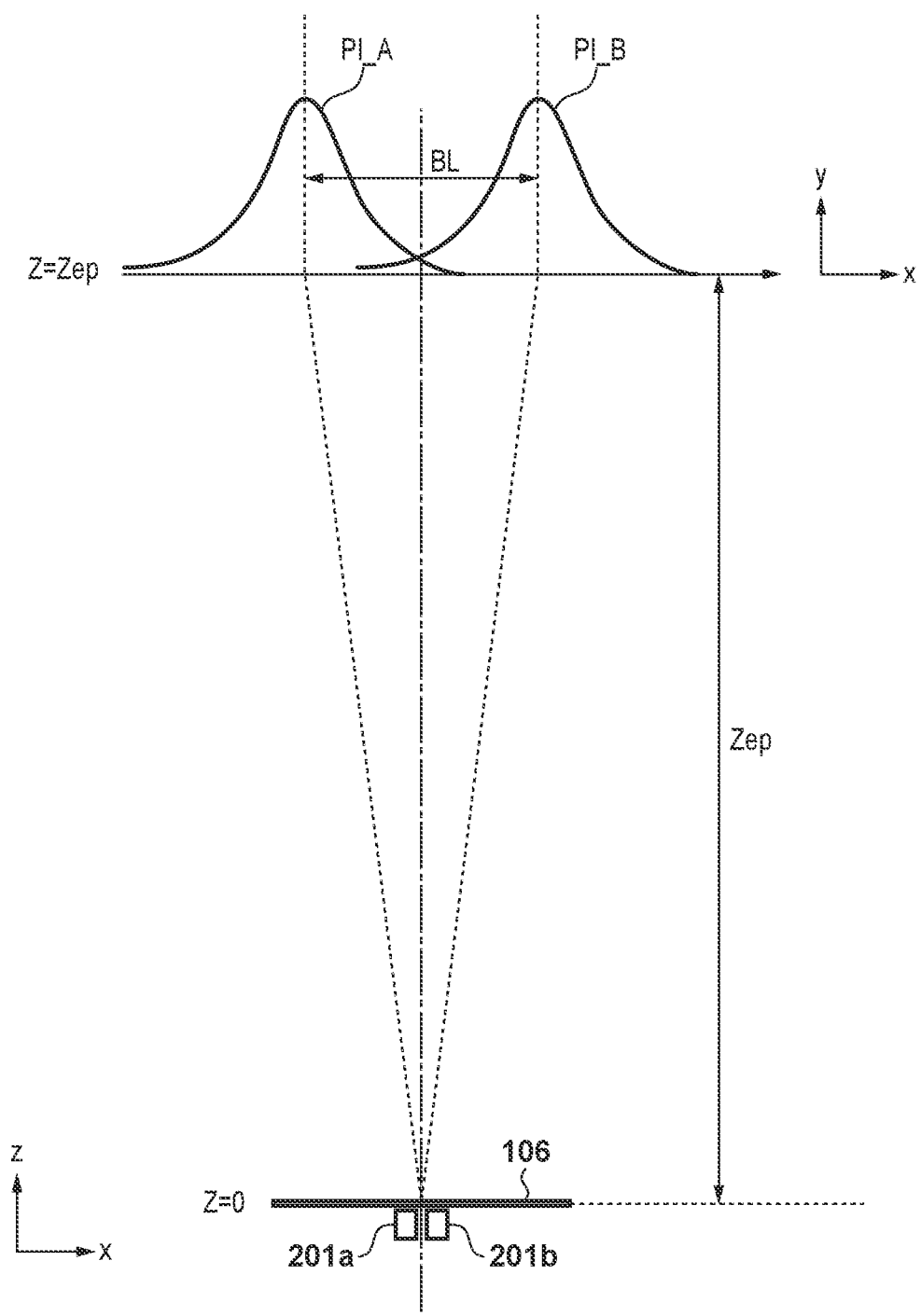
FIG. 4 is a view for explaining a method of calculating a conversion coefficient K.

FIG. 4 is a view for explaining a method of calculating the conversion coefficient K. Referring to FIG. 4, a Z-axis corresponds to the optical axis direction of the imaging optical system, and Z=0 corresponds to the surface (imaging surface) of the image sensor 106. Zep represents an exit pupil distance.

Pupil intensity distributions PI_A and PI_B are the light amount distributions of the focus detection light beams of the A image and the B image on Z=Zep. The pupil intensity distributions PI_A and PI_B are images obtained by projecting signals output from the photoelectric converters 201*a* and 201*b* onto the exit pupil plane, respectively.

Each of the pupil intensity distributions PI_A and PI_B indicates a one-dimensional pupil intensity distribution. In this case, the interval between the gravity centers of the pupil intensity distributions PI_A and PI_B is set as a base-line length BL. At this time, based on the ratio between the exit pupil distance Zep and the base-line length BL, a change amount [mm] in the optical axis direction with respect to the pixel shift amount P between the A image and the B image can be obtained. Therefore, the conversion coefficient K can be given by:

$$K = Zep/BL \quad (1)$$

Next, the ranging information calculation unit 112 calculates the defocus amount DEF [mm] by:

$$DEF = P \times K \quad (2)$$

When focusing on the focus detection position, the driving amount calculation unit 114 calculates, based on the defocus amount DEF, a driving amount M [mm] of the focus lens 102 by equation (3) below.

Then, the control unit 115 controls the focus driving unit 118 to drive the focus lens 102.

$$M = DEF \times FS \quad (3)$$

In equation (3), FS represents a coefficient for converting the defocus amount DEF [mm] into the lens driving amount [mm].

The control unit 115 controls the focus driving unit 118 to drive the focus lens 102 in the optical axis direction by the driving amount M. This can obtain an (in-focus) image focused at the focus detection position.

As described above, the driving amount calculation unit 114 can calculate the defocus amount DEF and the lens driving amount based on the ranging information obtained by the on-imaging plane phase difference method.

<Tilt Control>

Figure 5A:
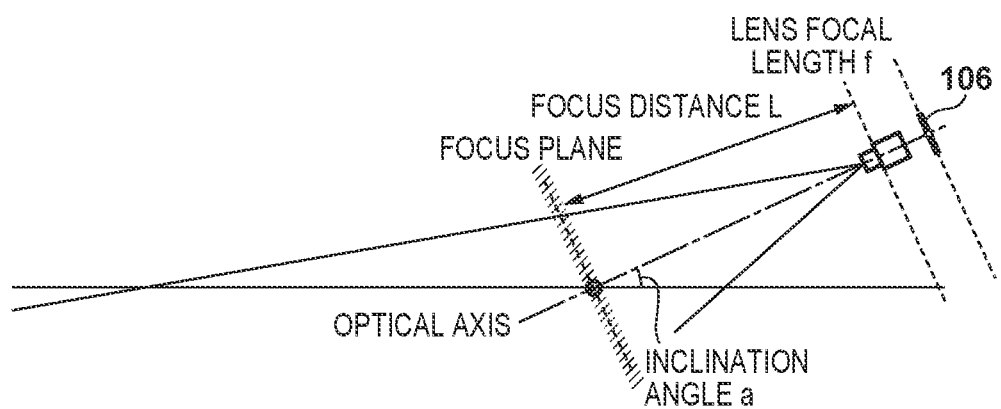
FIGS. 5A to 5C are views for explaining a focus plane in tilt imaging.
Figure 5B:
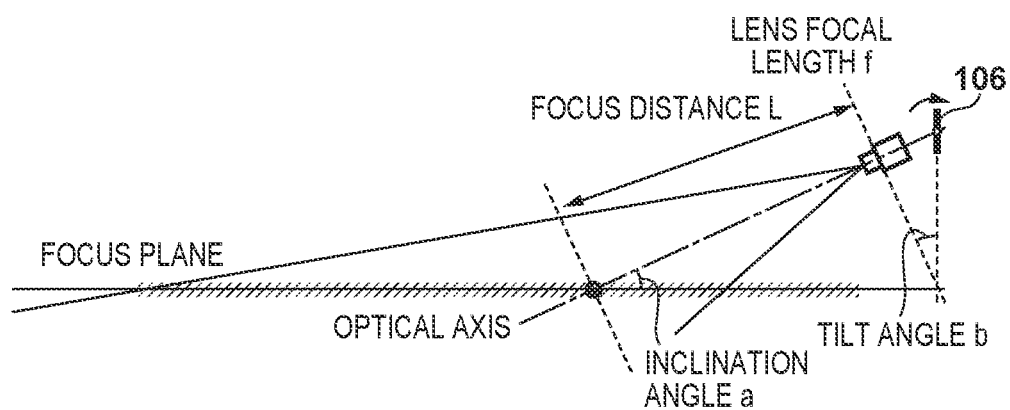
Figure 5C:
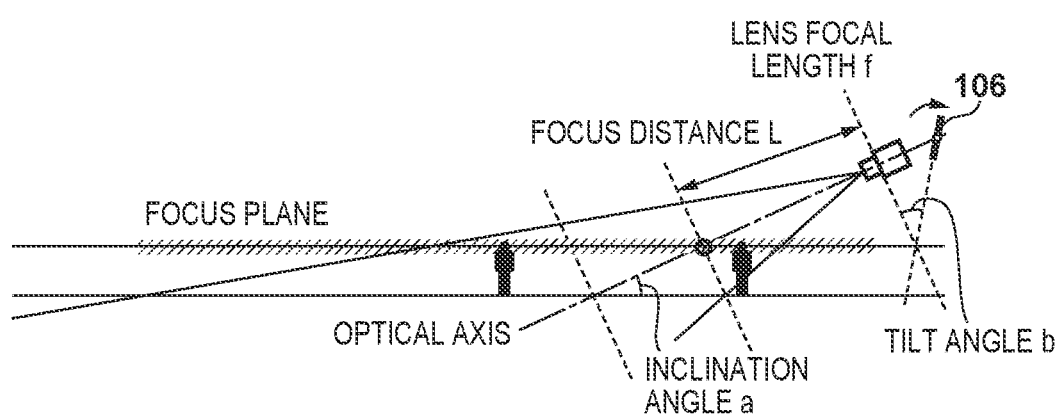

FIGS. 5A to 5C are views for explaining the focus plane in tilt imaging. FIG. 5A shows a state in which the principal surface of the imaging optical system is parallel to the image sensor 106. In this example, FIG. 5A shows a state in which focus is set at a focus distance L and the focus plane, the principal surface of the optical system, and the image sensor 106 are parallel to each other.

FIG. 5B shows a state in which the image sensor 106 is rotated by a tilt angle b from the state shown in FIG. 5A, and tilt control is executed. If tilt control is executed, the focus plane also rotates about the rotation axis of the focus plane corresponding to the rotation axis (tilt axis) of the image sensor based on the Scheimpflug principle. This can focus on all objects from a short distance to a long distance with respect to a given plane (the focus plane shown in FIG. 5B).

The Scheimpflug principle is the principle that if the principal surface of the optical system and the imaging surface of the image sensor 106 intersect one straight line, the focus plane also intersects on the same straight line.

Using a focal length f of the imaging optical system, the focus distance L, and a depression angle a, the tilt angle b is calculated, based on the Scheimpflug principle, by:

$$b=\tan^{-1}(f/(L\times \tan a)) \quad (4)$$

FIG. 5C shows a scene including objects X and Y. Among two persons shown in FIG. 5C, the person farther from the image capturing apparatus 100 will be referred to as the object X hereinafter, and the person closer to the image capturing apparatus 100 will be referred to as the object Y hereinafter. In this case, it is desirable to execute control to the focus plane (at which both the faces of the objects X and Y are in focus), as shown in FIG. 5C.

Therefore, as will be apparent by comparing FIG. 5C with FIG. 5A or 5B, it is necessary to execute not only tilt control but also focus control. However, it is difficult for the user to manually adjust the optimum focus plane (that is, the optimum tilt angle and focus position).

Figure 6:
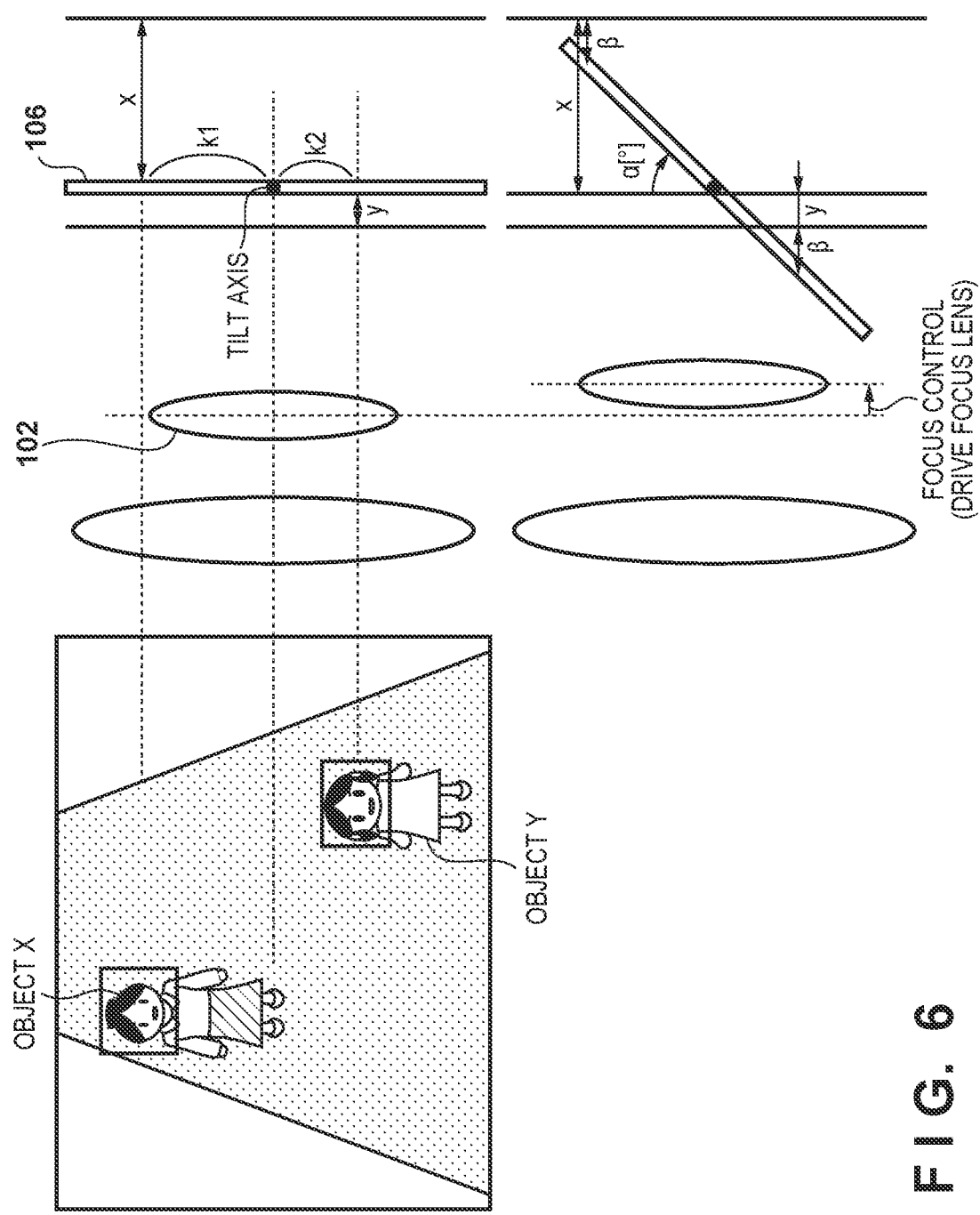
FIG. 6 is a view for explaining control of focus and a tilt angle.

FIG. 6 is a view for explaining control of focus and the tilt angle. The image capturing apparatus 100 is installed to capture a predetermined imaging range. The imaging range exemplified in FIG. 6 includes the objects X and Y as target objects, similar to FIG. 5C. An example of calculating the optimum tilt angle and focus position in accordance with the object will be described below with reference to FIG. 6.

In the initial state (for example, at the time of activation of the image capturing apparatus 100), the tilt angle of the image sensor 106 and the position of the focus lens 102 are in a state shown in the upper view of FIG. 6. x represents a necessary correction amount on the focus plane to focus on the object X and y represents a necessary correction amount on the focus plane to focus on the object Y. The distance from the tilt axis to the object on the image sensor 106 is represented by k1 [um] for the object X and k2 [um] for the object Y.

In this case, if α [°] represents a tilt angle to focus on the objects X and Y simultaneously, and β represents a focus correction amount on the focus plane, equations (5) and (6) below are obtained.

$$x-\beta = k1 \times \tan \alpha + \beta \quad (5)$$

$$y = k2 \times \tan \alpha - \beta \quad (6)$$

By solving simultaneous equations (5) and (6), the tilt angle a and the focus correction amount β are respectively given by:

$$\alpha = \tan^{-1}((x+y)/(k1+k2)) \quad (7)$$

$$\beta = ((k2 \times x - k1 \times y)/(k1+k2)) \quad (8)$$

The focus control amount can simply be calculated by dividing the focus correction amount β by the coefficient FS of the focus lens 102. However, it is possible to correctly calculate the focus control amount by solving a higher-order equation or a polynomial corresponding to the coefficient FS. The focus control amount may be calculated by another method.

It is understood from the above-described equations that it is important to correctly calculate the distance (k1 or k2) from the tilt axis to the object on the image sensor 106 in order to calculate the focus control amount (position) and the tilt control amount (angle). That is, in a case where the distance (k1 or k2) is incorrect, even if the focus position and the tilt angle are corrected, the object is a bit out of focus.

<Operation of Apparatus>

In the first embodiment, in accordance with a status (optical information), the base-line length is increased by performing ranging in a state in which tilt control is executed, thereby improving ranging accuracy with respect to a far object.

Figure 7:
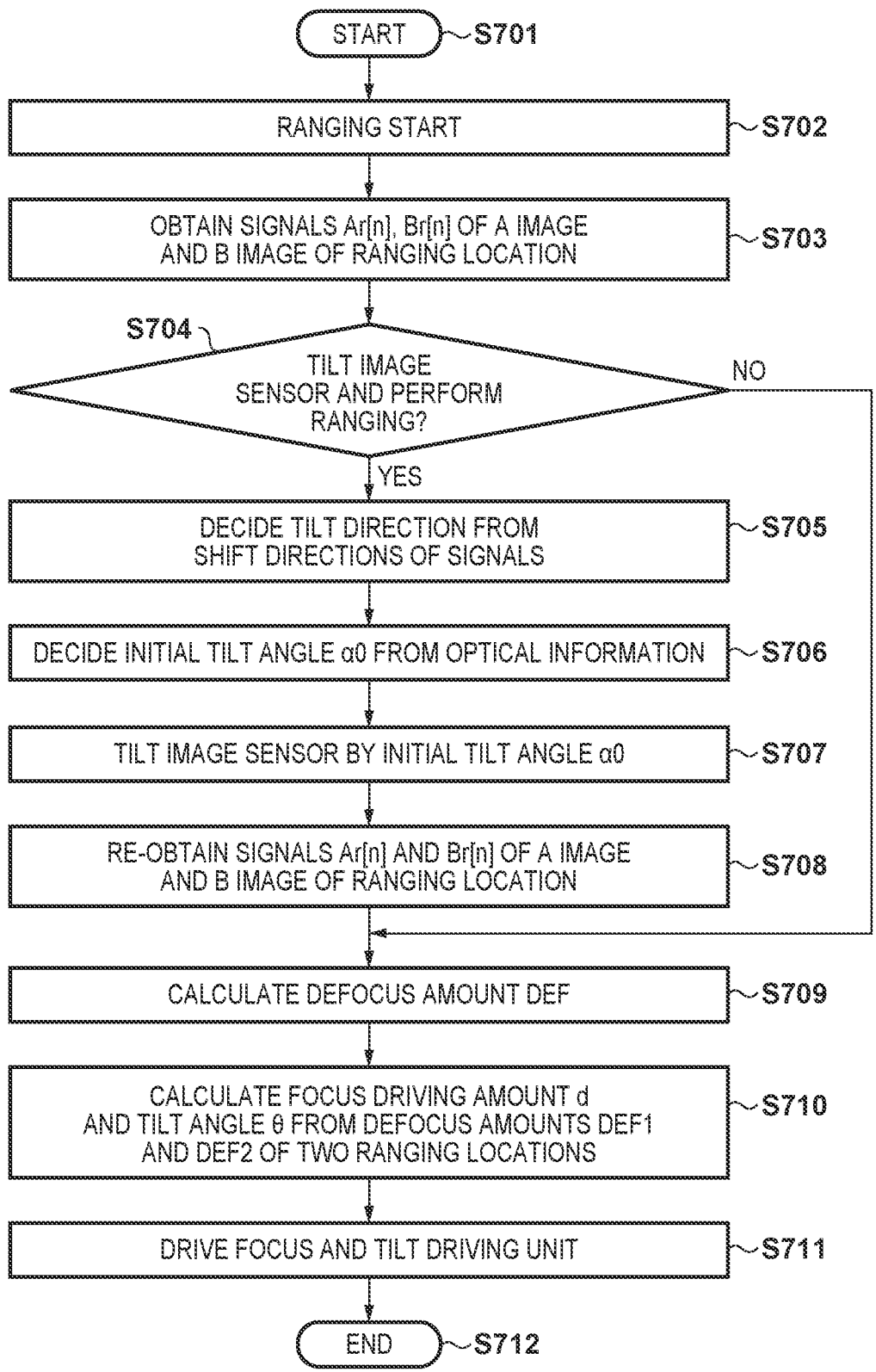
FIG. 7 is a flowchart for explaining control according to the first embodiment.

FIG. 7 is a flowchart for explaining control according to the first embodiment. This processing is started (step S701) when the communication unit 110 sends a ranging command to the control unit 115.

In step S702, the control unit 115 sends a ranging command to the driving amount calculation unit 114 to start a ranging operation. Note that calculation of a defocus amount in steps S702 to S709 is performed at two focus detection positions but the following description pay attention to one focus detection position for the sake of descriptive simplicity.

In step S703, the ranging information calculation unit 112 obtains the signals of the A image and the B image at the focus detection position of the image sensor 106. Note that the focus detection position may be a position determined, by the object determination unit 113, as a position at which the object exists, or a preset position.

In step S704, the driving amount calculation unit 114 determines, by using the optical information from the control unit 115, whether to perform ranging in a state in which the image sensor 106 is tilted. The optical information includes at least one of pieces of information of "the focal length of the lens", "the f-number of the lens", and "the distance (object distance) from the image capturing apparatus to the object". This determination processing may obtain the optical information at this time, and adaptively make determination or may make determination based on a prepared table. If initial tilting (tilting of the image sensor 106 for ranging) is necessary, the process advances to step S705; otherwise, the process advances to step S709.

FIG. 8 is a table showing an example of a determination table used to determine whether to perform initial tilting or not. FIG. 8 shows a table indicating that tilting is performed in a case where the depth of field is relatively small (the focal length is long and/or the f-number is small). However, FIG. 8 shows merely an example, and various modifications and changes can be made with respect to a table creation method.

In step S705, the driving amount calculation unit 114 decides a tilt direction based on the shift directions of the signals (A image and B image) obtained in step S703. For example, consider a case where the object X in the upper portion of the captured image is located farther than the object Y in the lower portion, and there exists the focus surface between the objects X and Y, as shown in FIG. 6. In this case, the signal for the object X is shifted in a direction indicating the infinity side, and the signal for the object Y is shifted in a direction indicating the close side. Therefore, the image sensor 106 is tilted in such a direction that these shifts are decreased.

In step S706, the driving amount calculation unit 114 calculates an initial tilt angle from the above-described optical information. Note that the initial tilt angle is desirably such an angle that the moving amount of the imaging surface falls within a depth of field Fδ so that a blur remains the same as that in a case where the image sensor is not tilted. If H represents the height of the image sensor 106, such an initial tilt angle α0 that the moving amount of the imaging surface is equal to the depth of field Fδ is given by:

$$\alpha 0 = \tan^{-1}(H/2F\delta) \quad (9)$$

In step S707, the control unit 115 controls the image sensor driving unit 116 in accordance with the initial tilt angle α0 calculated in step S706, thereby tilting the image sensor 106.

In step S708, the ranging information calculation unit 112 obtains the signals of the A image and the B image at the focus detection position of the image sensor 106 in the state in which the image sensor 106 is tilted in step S707. In step S709, the driving amount calculation unit 114 calculates the defocus amount.

FIG. 9 is a view for explaining a pixel shift amount in a case where the image sensor is tilted. In FIG. 9, the upper view shows a state (no-tilt state) in which the image sensor 106 is not tilted, and the lower view shows a state (tilted state) in which the image sensor 106 is tilted. Each of the upper view and the lower view exemplarily shows, from the left side, the positional relationship between the imaging optical system and the image sensor, the exit pupil at a center (tilt axis) position c of the image sensor 106, and the signal positions of the A image and the B image. Note that exit pupil indicates the exit pupil of the pixel (phase difference detection pixel) 201 at the position c by a pupil partial region of the A image and a pupil partial region of the B image.

By tilting the image sensor 106, the shape of the exit pupil in the "tilted state" has changed from the shape of an exit pupil 901 in the "no-tilt state". The shape of the exit pupil 901 has changed but the intensities of the A image signal and the B image signal remain the same. However, as compared with the no-tilt state, in the state in which the image sensor 106 is tilted, the gravity center of the light changes and the pixel shift amount P changes even for the same defocus amount. This is because the image sensor 106 is tilted to increase the base-line length in a pseudo manner. This phenomenon makes it impossible to calculate a correct defocus amount, and thus it is desirable to change the conversion coefficient K in accordance with tilt angle of the image sensor 106.

FIGS. 10A and 10B are tables showing correction tables of the conversion coefficient K. Data of the conversion coefficient K may be held in the tables shown in FIGS. 10A and 10B or the conversion coefficient K may be obtained by calculation. Since if the image sensor 106 is tilted, the base-line length increases in a pseudo manner, if the conversion coefficient K can be set appropriately, it is possible to calculate the correct defocus amount DEF, as compared with a case where ranging is performed without tilting the image sensor 106.

Note that in FIGS. 10A and 10B, the conversion coefficient K is decided based on the focus position, the image height at the focus detection position, and the tilt angle. However, FIGS. 10A and 10B show merely an example, and various modifications and changes can be made with respect to a table creation method.

Instead of using the prepared tables, it is also possible to adaptively obtain the conversion coefficient K by calculation. If a represents the tilt angle, the conversion coefficient K can be given by:

$$K=(Zep/BL) \times \cos \alpha \quad (10)$$

As will be understood from equation (10), as the tilt angle increases, the conversion coefficient K decreases. However, equation (10) is merely an example, and various modifications and changes can be made with respect to a calculation method.

In step S709, the ranging information calculation unit 112 calculates the defocus amount DEF based on the pixel shift amount P and the conversion coefficient K. As described above, in fact, two defocus amounts DEF1 and DEF2 corresponding to the two focus detection positions are calculated.

In step S710, the driving amount calculation unit 114 calculates a focus driving amount d and a tilt angle driving amount θ in subsequent imaging based on the one defocus amount DEF1 or DEF2 calculated in step S709.

In step S711, the control unit 115 controls the focus driving unit 118 and the image sensor driving unit 116 in accordance with the focus driving amount d and the tilt angle driving amount θ calculated in step S710.

By the control in step S711, the object existing in the predetermined imaging range is in focus, and thus the process ends in step S712.

As described above, according to the first embodiment, ranging is performed in state in which tilt control is executed in accordance with the optical information. This can increase the base-line length in a pseudo manner and improve ranging accuracy with respect to a far object. As a result, it is possible to more accurately calculate the tilt angle and the focus position in tilt imaging.

Second Embodiment

The above first embodiment has explained a form in which an initial tilt angle and whether to perform initial tilting are determined in accordance with optical information. The second embodiment will describe a form in which an initial tilt angle and whether to perform initial tilting are determined in accordance with a defocus amount in addition to the optical information.

<Operation of Apparatus>

Figure 11:
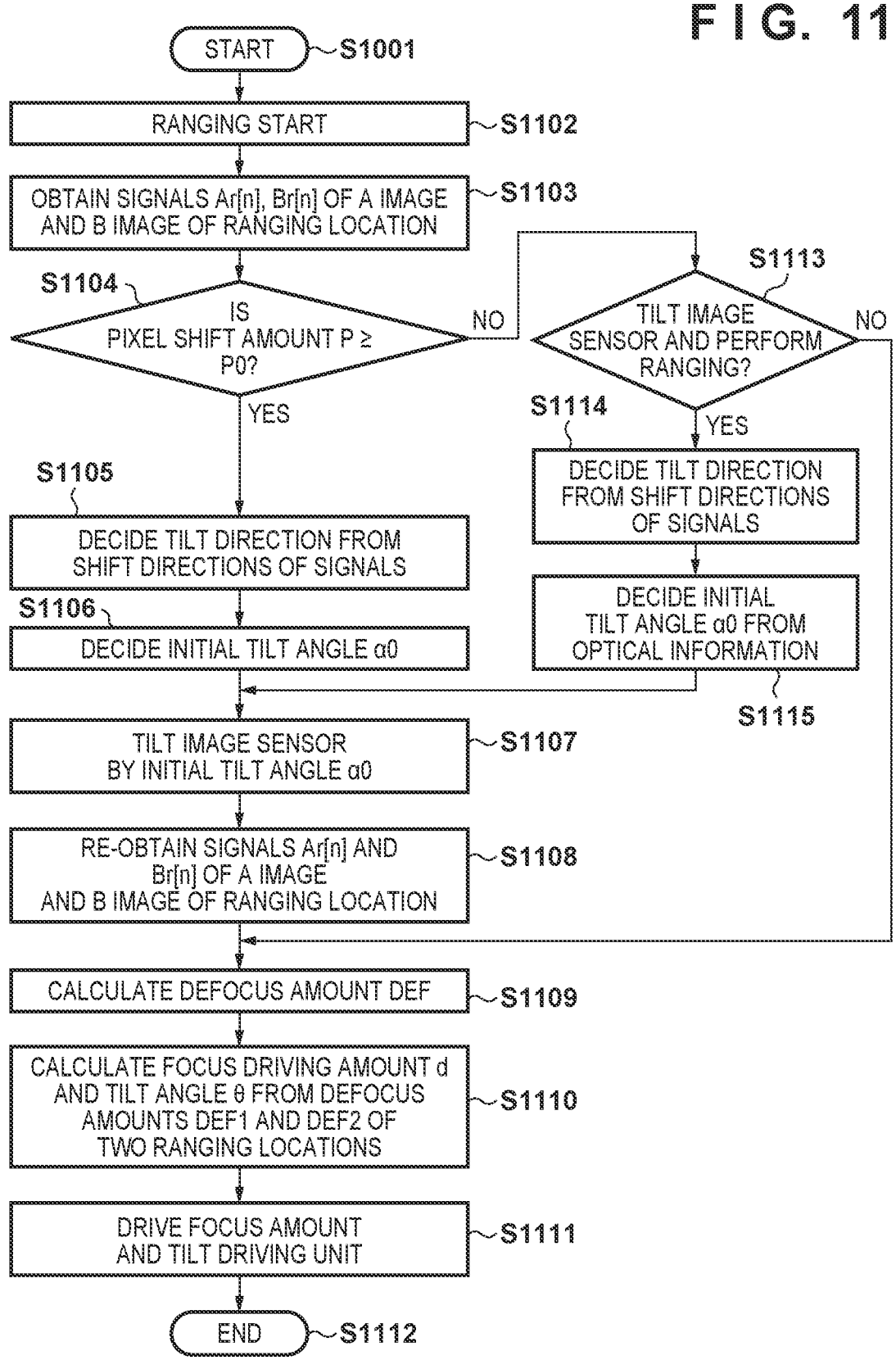
FIG. 11 is a flowchart for explaining control according to the second embodiment.

FIG. 11 is a flowchart for explaining control according to the second embodiment. Note that steps S1001 to S1103, S1113 to S1115, and S1107 to S1112 are the same as steps S701 to S703, S704 to S706, and S707 to S712 in the first embodiment (FIG. 7), respectively, and a detailed description thereof will be omitted.

In step S1104, a driving amount calculation unit 114 determines whether a pixel shift amount P is equal to or larger than a predetermined threshold (P0). If the pixel shift amount P is equal to or larger than P0, the process advances to step S1105; otherwise, the process advance to step S1113. For example, this determination processing is performed for each of two focus detection positions, and it is determined whether the pixel shift amount P is equal to or larger than P0 at least one focus detection position.

In step S1105, the driving amount calculation unit 114 decides a tilt direction. This processing can decide the tilt direction based on the shift directions of signals (A image and B image) obtained in step S1103 by the same method as in step S705 described above but a predetermined direction may be decided in advance based on the installation state of the image capturing apparatus (for example, image capturing in an obliquely downward direction, as shown in FIGS. 5A to 5C).

In step S1106, the driving amount calculation unit 114 decides an initial tilt angle α0. In this case, since it is determined in step S1104 that the pixel shift amount P is equal to or larger than P0, it is known that the object largely blurs at the current time. Therefore, even if an image sensor 106 is largely moved, this hardly influences an image (does not cause discomfort to the user). Thus, the driving amount calculation unit 114 decides a predetermined angle value (for example, the maximum value of the tilt angle of the image sensor 106 or the like) as the initial tilt angle α0. Furthermore, a predetermined angle value may be decided in advance based on the installation state of the image capturing apparatus (for example, image capturing in an obliquely downward direction, as shown in FIGS. 5A to 5C). After that, the process advances to step S1107.

As described above, according to the second embodiment, in a case where the pixel shift amount P is equal to or larger than the predetermined threshold, the image sensor 106 is tilted by the predetermined angle value to perform ranging. This can increase a base-line length in a pseudo manner and improve ranging accuracy with respect to a far object, similar to the first embodiment. Furthermore, for example, the maximum value of the tilt angle of the image sensor 106 is set as the initial tilt angle α0, the base-line length is maximized in a pseudo manner, and thus it is possible to further improve the ranging accuracy, as compared with the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-114322, filed Jul. 15, 2022 which is hereby incorporated by reference herein in its entirety.

What is claimed is:

1. An image capturing apparatus comprising:
an image sensor for generating an image signal from an object image formed by an imaging optical system;
a hardware processor; and
a memory for storing instructions to be executed by the hardware processor, wherein, when the instructions stored in the memory are executed by the hardware processor, the image capturing apparatus functions as:
a tilt control unit configured to execute tilt control of tilting the image sensor with respect to a principal surface of the imaging optical system;
a deriving unit configured to derive, by a phase difference detection pixel included in the image sensor, a defocus amount with respect to an object image at a position of the phase difference detection pixel;
an information obtaining unit configured to obtain at least one of pieces of information of a focal length of the imaging optical system, an f-number of the imaging optical system, and a distance from the image capturing apparatus to an object;
a determination unit configured to determine, based on the at least one of pieces of information obtained by the information obtaining unit, whether to execute the tilt control by the tilt control unit; and
a control unit configured to control to execute the tilt control by the tilt control unit in deriving the defocus amount by the deriving unit, wherein the control unit controls to derive, by the deriving unit, a defocus amount based on an object image obtained while executing the tilt control if the determination unit determines to execute the tilt control, and to derive, by the deriving unit, a defocus amount based on an object image obtained without executing the tilt control if the determination unit determines not to execute the tilt control.

2. The apparatus according to claim 1, wherein
the phase difference detection pixel includes two photoelectric converters, and
the deriving unit includes
a detection unit configured to detect a pixel shift amount based on a correlation amount between a pair of signals respectively obtained from the two photoelectric converters, and
a calculation unit configured to calculate the defocus amount by multiplying, by a conversion coefficient, the pixel shift amount detected by the detection unit.

3. The apparatus according to claim 2, wherein, when the instructions stored in the memory are executed by the hardware processor, the apparatus further functions as:
a second determination unit configured to determine, based on whether the pixel shift amount detected by the detection unit is not smaller than a predetermined threshold, whether to execute the control by the control unit.

4. The apparatus according to claim 3, wherein in a case where the second determination unit determines to execute the control by the control unit, the tilt control unit decides a maximum value of a tilt angle of the image sensor as a control amount of the tilt control.

5. The apparatus according to claim 2, wherein the conversion coefficient is calculated by multiplying a value of a ratio between an exit pupil distance and a base-line length by a correction coefficient decided based on a tilt control amount in obtaining the pair of signals.

6. The apparatus according to claim 1, wherein
the image capturing apparatus is configured to capture a predetermined imaging range, and
the image capturing apparatus further comprises a control amount calculation unit configured to calculate, based on the defocus amount based on the object image obtained while executing the tilt control, a focus control amount in the imaging optical system and a tilt control amount by the tilt control unit in subsequently capturing the predetermined imaging range.

7. The apparatus according to claim 1, wherein the determination unit performs the determination based on a prepared determination table.

8. The apparatus according to claim 7, wherein the determination table is set based on a combination of the focal length of the imaging optical system and the f-number of the imaging optical system.

9. The apparatus according to claim 1, wherein in a case where the determination unit determines to execute the control by the control unit, a direction of the tilt control is decided based on shift directions of the pair of signals, and a control amount of the tilt control is decided based on the information obtained by the information obtaining unit.

10. A control method for an image capturing apparatus, the image capturing apparatus including
an image sensor for generating an image signal from an object image formed by an imaging optical system, wherein the image sensor is configured to be tiltable, by tilt control, with respect to the imaging optical system, and
a deriving unit configured to derive, by a phase difference detection pixel included in the image sensor, a defocus amount with respect to an object image at a position of the phase difference detection pixel,
the control method comprising:
obtaining at least one of pieces of information of a focal length of the imaging optical system, an f-number of the imaging optical system, and a distance from the image capturing apparatus to an object;
determining, based on the obtained at least one of pieces of information, whether to execute the tilt control by the tilt control unit; and
controlling to execute the tilt control in deriving the defocus amount by the deriving unit, and to derive, by the deriving unit, a defocus amount based on an object image obtained while executing the tilt control if determining to execute the tilt control, and deriving a defocus amount based on an object image obtained without executing the tilt control if determining not to execute the tilt control.

11. A non-transitory computer-readable storage medium storing a program that, when executed by a computer, causes the computer to perform a control method for an image capturing apparatus, the image capturing apparatus includes an image sensor for generating an image signal from an object image formed by an imaging optical system, wherein the image sensor is configured to be tiltable, by tilt control, with respect to the imaging optical system, and a deriving unit configured to derive, by a phase difference detection pixel included in the image sensor, a defocus amount with respect to an object image at a position of the phase difference detection pixel, the control method comprising:
obtaining at least one of pieces of information of a focal length of the imaging optical system, an f-number of the imaging optical system, and a distance from the image capturing apparatus to an object;
determining, based on the obtained at least one of pieces of information, whether to execute the tilt control by the tilt control unit; and
controlling to execute the tilt control in deriving the defocus amount by the deriving unit, and to derive, by the deriving unit, a defocus amount based on an object image obtained while executing the tilt control if determining to execute the tilt control, and deriving a defocus amount based on an object image obtained without executing the tilt control if determining not to execute the tilt control.

* * * * *